US006993957B2

(12) United States Patent
Kano et al.

(10) Patent No.: US 6,993,957 B2
(45) Date of Patent: Feb. 7, 2006

(54) LEAK CHECK DEVICE FOR EVAPORATED FUEL PURGING SYSTEM

(75) Inventors: Masao Kano, Gamagori (JP); Yoshichika Yamada, Kuwana-gun (JP); Mitsuyuki Kobayashi, Gamagori (JP); Koichi Inagaki, Okazaki (JP)

(73) Assignee: Denso Corporation, (JP)

( * ) Notice: Subject to any disclaimer, the term of this patent is extended or adjusted under 35 U.S.C. 154(b) by 103 days.

(21) Appl. No.: 10/758,226

(22) Filed: Jan. 16, 2004

(65) Prior Publication Data

US 2004/0149016 A1 Aug. 5, 2004

(30) Foreign Application Priority Data

Jan. 29, 2003 (JP) ............................ 2003-020503

(51) Int. Cl.
*G01M 3/04* (2006.01)

(52) U.S. Cl. ....................................................... 73/49.7

(58) Field of Classification Search .................... 73/40, 73/40.5 R, 49.7, 118.1; 123/518, 519, 520, 123/521; 702/51

See application file for complete search history.

(56) References Cited

U.S. PATENT DOCUMENTS

| | | | | |
|---|---|---|---|---|
| 4,817,870 | A * | 4/1989 | Dalton | 239/157 |
| 5,635,630 | A * | 6/1997 | Dawson et al. | 123/520 |
| 5,890,474 | A | 4/1999 | Schnaibel et al. | |
| 6,161,423 | A * | 12/2000 | Okuma | 123/520 |

FOREIGN PATENT DOCUMENTS

| | | |
|---|---|---|
| JP | 11-336619 | 12/1999 |
| JP | 2000-205056 | 7/2000 |

OTHER PUBLICATIONS

Machine translation of Japanese Application Publication 2000-205056.*

* cited by examiner

*Primary Examiner*—Charles Garber
(74) *Attorney, Agent, or Firm*—Nixon & Vanderhye PC

(57) ABSTRACT

An evaporated fuel purge system has a fuel tank, an adsorption filter and a purge control valve. The evaporated fuel purge system is pressurized and depressurized through a venting flow path by a pump, so that the state of leakage therefrom is thereby inspected. For this inspection, a motor unit for driving the pump which applies or reduces pressure, an in-vehicle battery and a voltage control circuit which controls a battery voltage to a predetermined voltage and supplies the motor unit with a current are provided. A switchover valve is integrated with the pump, the motor and the like into a single module.

9 Claims, 7 Drawing Sheets

LEAK CHECK DEVICE FOR EVAPORATED FUEL PURGING SYSTEM

CROSS REFERENCE TO RELATED APPLICATION

This application is based on and incorporates herein by reference Japanese Patent Application No. 2003-20503 filed on Jan. 29, 2003.

FIELD OF THE INVENTION

The present invention relates to a leak check device for evaporated fuel purging system.

BACKGROUND OF THE INVENTION

An evaporated fuel purging system includes, for example, a fuel tank of an internal combustion engine, a canister, and a purge control valve. This evaporated fuel purging system is so designed that evaporated fuel produced in the fuel tank is temporarily adsorbed to the canister. The evaporated fuel adsorbed to the canister is taken, together with fresh air introduced through the fresh air inlet in the canister, into the air intake system of the internal combustion engine through the purge control valve. However, when a crack or the like exists in a pipe or container constituting an evaporated fuel recovery path running from the fuel tank to the purge control valve through the canister, the evaporated fuel leaks to the outside and the effect of preventing the emission of evaporated fuel cannot be sufficiently attained.

Recently, strict leak check has become mandatory against evaporated fuel emissions from fuel reservoir systems, such as the fuel tank of the vehicle, into the atmosphere. For this reason, a variety of leak check systems for diagnosing leakage from the evaporated fuel purging system are proposed.

According to U.S. Pat. No. 5,890,474 (JP-A-10-90107: Patent Document 1), a module is placed on the atmosphere port side of a canister. In this module, a switchover valve for switching flow paths and a motor pump are connected and integrated with each other. A reference leak is caused by the motor pump with pressure as a result of changing the flow path by the switchover valve. Then, the state of leakage from an evaporated fuel recovery path is compared with the reference leak. More specifically, pressure is alternately applied by the motor pump, for example, to a reference orifice and to the atmosphere port side of the canister, that is, the evaporated fuel recovery path. The reference orifice is for providing leakage reference values established by the California Air Resources Board (CARB) and the Environmental Protection Agency (EPA). At this time, the voltage of the motor pump is measured in the respective cases, and the comparison is made by operation characteristic values, such as current consumption, obtained therefrom.

According to the prior art disclosed in JP-A-11-336619 (Patent Document 2), a detecting device for detecting the state of use of an air conditioner is provided for prevention of erroneous determination due to the influences of the vapor pressure of fuel. A determination value for reference leak is corrected according to the results of detection by the detecting device. When the air conditioner is in operation, the outdoor temperature is estimated to be high, and the fuel temperature is also considered to be high.

According to the prior art disclosed in JP-A-2000-205056 (Patent Document 3), the driving voltage for a motor pump is changed to shorten time required for diagnosing a leak. Immediately after a start of driving, the motor pump is driven on relatively high voltage to increase the amount of discharging from the motor pump. Thereafter, the voltage is returned to normal voltage to return the amount of discharging to the reference amount of discharging for leak diagnosis.

The above prior arts are not satisfactory. When the supply voltage of a battery or the like for driving a motor pump fluctuates, the driving voltage proportionally fluctuates, which varies the performance of the motor pump itself. For example, when the supply voltage has dropped due to deterioration in a battery, the driving voltage of the electric motor unit constituting the motor pump drops. As a result, the capability of the motor pump to apply pressure is lowered. This decrease in motor pump power takes place not only in pressure pumps which discharge air to apply pressure but also in vacuum pumps which suck air or the like to reduce pressure.

The reference pressure based on a reference orifice and the internal pressure in an evaporated fuel recovery path can be measured using a vacuum pump and compared with each other. The influences of some factors on the accuracy of comparative determination in this case will be described below.

FIG. 10A is a graph plotting pressure change characteristics with low supply voltage, and FIG. 10B is a graph plotting pressure change characteristics with high supply voltage. In these graphs of pressure change characteristics, the horizontal axes show elapsed time and the vertical axes show absolute pressure P. The elapsed time can be divided into, for example, four sections, section A to section E, in correspondence with the process of leak check. The reference pressure Pr and the internal pressure in evaporated fuel recovery path are evaluated in sections C and D, respectively. With the lowered supply voltage, illustrated in FIG. 10A, the performance of the vacuum pump degrades.

Accordingly, the reference pressure Pr approaches the atmospheric pressure Patm, and the magnitude of the negative pressure of reference pressure is also reduced (section C). Thus, the difference between the reference pressure Pr obtained by the reference orifice and the atmospheric pressure Patm is reduced. Therefore, the differences are reduced between three different pressure change characteristics: pressure change characteristics with $\phi$ 0.5 mm which is the same as the size of the hole in the reference orifice; pressure change characteristics with $\phi$ more than 0.5 mm with which a large leak takes place; and pressure change characteristics without leak. As a result, the accuracy of leak detection for determining in which state of leakage the size of a leaking hole determined from internal pressure change in section D is can be impaired.

With the high supply voltage, as illustrated in FIG. 10B, the reference pressure Pr deviates from the atmospheric pressure Patm, and the magnitude of the negative pressure of the reference pressure Pr is increased (Section C). As a result, the difference between the reference pressure Pr and the atmospheric pressure Patm is increased. Therefore, it is likely that a relief valve for failsafe is opened before a desired reference pressure is reached. Once the relief valve is opened, a leak will not be detected. When the setting of valve opening pressure for the relief valve is increased, the pump power is excessively increased and the fuel tank is overloaded. Therefore, the rigidity of the fuel tank must be enhanced to ensure the sufficient strength of the fuel tank.

For the above reasons, it is difficult to enhance the accuracy of leak detection with the above prior arts. Therefore, there is a possibility that the leakage reference values established by CARB and EPA or stricter leakage reference values in the future cannot be met.

SUMMARY OF THE INVENTION

The object of the present invention is to provide a leak check device for evaporated fuel purging system which checks a leak by applying or reducing pressure by a motor pump so that the accuracy of leak detection can be enhanced.

A leak check device for evaporated fuel purging system according to the present invention is so constructed to inspect an evaporated fuel purge system for leakage by pressurizing or depressurizing it from a pump through a venting flow path. The leak check device comprises a motor unit which drives the motor for applying or reducing pressure, an in-vehicle power supply, and a voltage control circuit which controls battery voltage from the in-vehicle power supply to a predetermined voltage and supplies the motor unit with a current. Specifically, the predetermined voltage is regulated to be less than a starter driving minimum voltage.

In the evaporated fuel purging system which prevents evaporated fuel produced in the fuel tank of a vehicle from being emitted into the atmosphere, the evaporated fuel is temporarily adsorbed into an adsorption filter, such as a canister, and retains it in the evaporated fuel purge system. The retained evaporated fuel is taken into the air intake system when the internal combustion engine is brought into a predetermined state of operation. In case of common 12V-battery vehicles, the battery voltage of the in-vehicle power supply fluctuates within the range of 8 to 16V.

The motor unit which drives the pump for pressurizing or depressurizing the evaporated fuel purge system for leak check is fed with input voltage obtained by converting the battery voltage into a predetermined voltage through the voltage control circuit. Even if the battery voltage fluctuates, therefore, the input voltage can be set to, for example, a predetermined voltage within a voltage range in which the battery voltage fluctuates. Thus, variation in the output characteristics of the motor unit and variation in the pump power of the pump driven by the motor unit due to fluctuation in battery voltage can be reduced. As a result, the accuracy of leak detection for inspecting the state of leakage can be enhanced.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENT

First Embodiment

Figure 1:
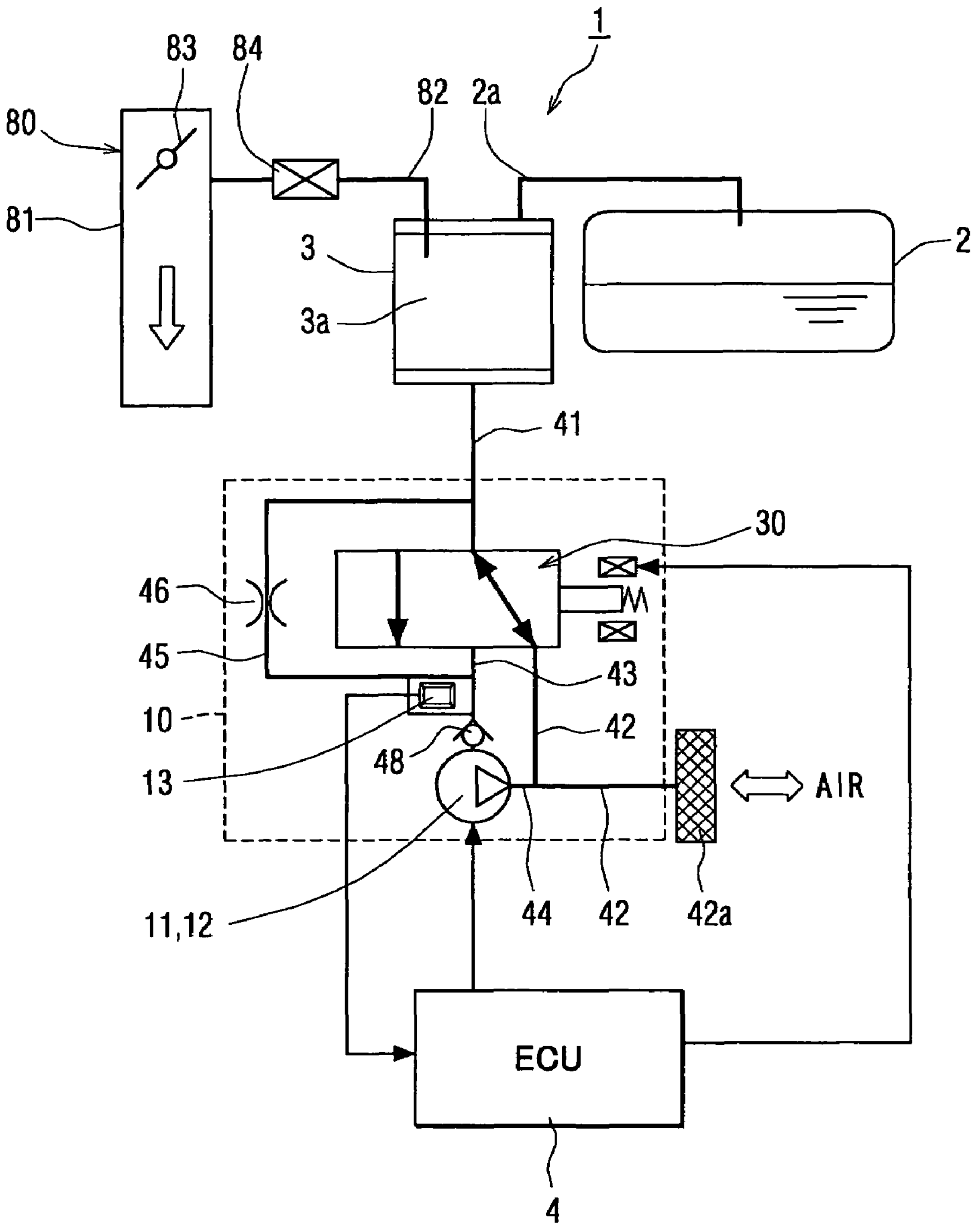
FIG. 1 is a schematic block diagram illustrating a leak check device for evaporated fuel purging system in the first embodiment of the present invention.

As illustrated in FIG. 1, an evaporated fuel purging system comprises a fuel tank 2, a canister 3 as an adsorption filter which is connected with the fuel tank 2 through a connecting flow path 2*a* and has a venting flow path 41, and a purge control valve 84 as a vent valve. One end of the vent valve 84 connects to the canister 3 through a valve flow path 82 and the other end of the same connects to the intake system 80 of an internal combustion engine through the valve flow path 82. The canister 3 contains adsorbent 3*a* such as activated carbon.

Part of fuel retained in the fuel tank 2 is evaporated, and evaporated fuel is produced in the fuel tank 2. The evaporated fuel is guided into the canister 3 and temporarily adsorbed and accumulated therein. When the purge control valve 84 is opened by air with reduced pressure in the intake system 80, air is taken in through an open flow path 42, the canister 3, and the valve flow path 82. At the same time, the evaporated fuel accumulated in the canister 3 is taken into an inlet pipe 81, that is, supplied into the internal combustion engine and burned there. The evaporated fuel produced in the fuel tank 2 passes through the canister 3 and thereby adsorbed in the canister 3, and air flows out of the canister 3 into the atmosphere.

The intake system 80 has the inlet pipe 81 connecting to the air intake system of the internal combustion engine. The inlet pipe 81 is provided with a throttle valve 83 for adjusting the flow rate of intake air flowing therein. The valve flow path 82 is open into the inlet pipe 81 downstream or upstream of the throttle valve 83 with respect to intake air.

The fuel tank 2, canister 3, purge control valve 84, connecting flow path 2*a*, and valve flow path 82 constitute an evaporated fuel purge system 1. The evaporated fuel purge system 1 retains evaporated fuel produced in the fuel tank 2 while the purge control valve 84 is closed. The evaporated fuel purge system 1 thereby prevents the evaporated fuel from being emitted into the atmosphere.

The leak check device is for inspecting the retaining function of the evaporated fuel purge system 1, that is, the state of leakage from the evaporated fuel purge system 1. The leak check device comprises a pump 11 as a pressure source, a motor unit 12 which drives the pump 11, a switchover valve 30, a reference channel 45 for detecting a reference leak, and a pressure sensor 13 as a pressure detecting means for detecting pressure applied by the pump 11.

It is preferable that the pump 11, motor unit 12, switchover valve 30, reference channel 45, and pressure sensor 13 should be disposed above the fuel tank 2 and the canister 3. Thus, liquid fuel or water is prevented from entering these members from the fuel tank 2 or the canister 3. Furthermore, it is preferable that these members should be integrally assembled into a module. This enhances the workability in assembling the leak check device into the evaporated fuel purge system 1 to inspect the state of leakage from the evaporated fuel purge system 1.

The venting flow path 41 connects to the fuel tank 2 by way of the canister 3. The venting flow path 41 can be alternately connected to the open flow path 42 and to the pump 11 by switching of the switchover valve 30. The open flow path 42 has an open end 42*a* which is open to the atmosphere. It is preferable that the open end 42*a* should be provided with a filter for the prevention of ingress of foreign matters such as dust.

The venting flow path 41 is branched to the switchover valve 30 and to the reference channel 45. Thus, when the venting flow path 41 connects to the open flow path 42 by switching of the switchover valve 30, air introduced through the open flow path 42 can be guided to the reference channel 45. When the venting flow path 41 connects to the pump 11 by switching of the switchover valve 30, the air retained in the venting flow path 41 from which evaporated fuel was adsorbed into the canister 3 can be guided to the pump 11 by way of a valve-connecting flow path 43.

An exhaust flow path 44 lets through air which is discharged from the pump 11 and emitted into the atmosphere through the flow path 42.

The reference channel 45 is provided with a reference orifice 46 as a throttling unit. The reference orifice 46 corresponds to the size of an opening for which leakage of evaporated fuel is acceptable. For example, the CARB and EPA standards provide for the accuracy of detecting leakage of evaporated fuel from an evaporated fuel recovery path, such as a fuel tank 2, that is, an evaporated fuel purge system 1. The standards require that evaporated fuel leaking through an opening equivalent to $\phi$ 0.5 mm should be capable of being detected. For this reason, in this embodiment, the reference orifice 46 having an opening set to, for example, $\phi$ 0.5 mm or less is placed in the reference channel 45.

The pump 11 is a positive displacement pump such as a vane pump of known construction. The pump 11 is driven by the motor unit 12 such as a DC motor or brushless motor. The pump 11 and the motor unit 12 constitute an electric motor, and the electric motor is driven by a current supplied from the in-vehicle power supply. The switchover valve 30 may be any type of electromagnetic valve as long as it is provided with a known switchover valve of three-way valve construction.

The pressure sensor 13 is placed in the valve-connecting flow path 43. The pressure sensor 13 detects pressure in the valve-connecting flow path 43, and outputs a signal corresponding to the pressure to an electronic control unit (ECU) 4 as a controlling means. The ECU 4 comprises a microcomputer (not shown) having a CPU, a ROM, and a RAM. The ECU 4 is mounted for controlling each component of the internal combustion engine to which the leak check device for evaporated fuel purging system 1 is applied. The ECU 4 is fed with signals outputted from various sensors, including the pressure sensor 13, installed at various parts of the internal combustion engine. According to these inputted signals, the ECU 4 controls various parts of the internal combustion engine in accordance with predetermined control programs recorded in the ROM. The switchover valve 30 is controlled by the ECU 4.

Next, the operation of the leak check device constituted as described above will be described. When a predetermined period of time has passed after the operation of the internal combustion engine is stopped, check is started for leakage of evaporated fuel from the evaporated fuel purge system 1. A period of time required for the temperature of the vehicle to stabilize is set for this predetermined period of time.

(1) First, the atmospheric pressure is detected. In this embodiment, the leakage of evaporated fuel from the evaporated fuel purge system 1 is detected based on pressure change. Therefore, the influences of variation in atmospheric pressure due to difference in altitude must be reduced. Consequently, the atmospheric pressure is detected prior to leak check for inspecting the state of leakage. The atmospheric pressure is detected by the pressure sensor 13 placed in the valve-connecting flow path 43. When the electromagnetic drive unit of the switchover valve 30 is not supplied with power, the open flow path 42 connects to the valve-connecting flow path 43 by way of the reference channel 45. Therefore, the pressure in the valve-connecting flow path 43 is substantially identical with the atmospheric pressure.

The pressure detected by the pressure sensor 13 is outputted as a pressure signal to the ECU 4. The pressure signal outputted from the pressure sensor 13 is outputted as voltage ratio, duty ratio, or bit output. Thus, the influences of noise produced by surrounding electrical drive units, such as the electromagnetic drive unit of the switchover valve 30, can be reduced. As a result, the high accuracy of pressure detection can be maintained.

By detecting the atmospheric pressure by the pressure sensor 13, the atmospheric pressure in proximity to the leak check device can be measured. For this reason, the accuracy of detection can be enhanced as compared with cases where the atmospheric pressure is detected by an atmospheric pressure sensor, for example, the sensor of a fuel injector, placed at a distance from the leak check device.

With respect to energization of the motor unit 12, pressure sensor 13, and switchover valve 30, only the pressure sensor 13 is turned on, and power supply to the motor unit 12 and the switchover valve 30 is at a stop (OFF). This state is referred to as "atmospheric pressure detection period A" (for example, section A in FIGS. 10A and 10B). For this reason, the pressure in the valve-connecting flow path 43 detected by the pressure sensor 13 is identical with the atmospheric pressure Patm.

(2) When the detection of the atmospheric pressure is completed, the altitude at which the vehicle mounted with the leak check device is positioned is computed from the detected atmospheric pressure. For example, the altitude is determined from a map of correlation between atmospheric pressure and altitude, stored in the ROM of the ECU 4. Based on the determined altitude, various parameters for use in leak check from that time forward are corrected. These processing is carried out by the ECU 4.

When the correction of parameters is completed, power supply to the switchover valve 30 is started (ON). As a result, power supply to the motor unit 12, pressure sensor 13, and switchover valve 30 turns off, on, and on, respectively. This state is referred to as produced evaporated fuel detection state B (for example, section B in FIGS. 10A and 10B). Thus, the open flow path 42 and the valve-connecting flow path 43 is disconnected from each other. Further the venting flow path 41 and the valve-connecting flow path 43 are connected to each other.

At this time, the fuel tank 2 is isolated from the atmosphere without fail by a check valve 48, which does not open until a preset pressure is reached. When fuel is evaporated in the fuel tank 2 and evaporated fuel is produced therein, the pressure in the fuel tank 2 becomes higher than the outside pressure. Therefore, the pressure in the valve-connecting flow path 43 detected by the pressure sensor 13 is slightly increased. To the contrary, when the fuel vapor temperature lowers and evaporated fuel is liquefied, the pressure in the fuel tank 2 becomes lower than the outside pressure. Therefore, the pressure in the valve-connecting flow path 43 detected by the pressure sensor 13 slightly drops.

(3) When it is detected that pressure change due to the production of evaporated fuel in the fuel tank 2 is a predetermined value or less, power supply to the switchover valve 30 is interrupted (OFF). Further, power supply to the motor unit 12 is started (ON). As a result, power supply to the motor unit 12, pressure sensor 13, and switchover valve 30 turns on, on and off, respectively. This state is referred to as "reference leak detection state C", (for example, section C in FIGS. 10A and 10B).

Thus, the pump 1 is driven, and the valve-connecting flow path 43 is depressurized. As a result, the air in the open flow path 42 flows into the reference channel 45 by way of the reference orifice 46. Since the air flow into the reference channel 45 is throttled by the reference orifice 46, the pressure in the reference channel 45 is lowered. The reference orifice 46 is set to a predetermined size. Therefore, the pressure in the reference channel 45 drops until a predetermined pressure is reached, and then becomes constant. At this time, the detected predetermined pressure in the reference channel 45 is stored in the RAM of the ECU 4 as the reference pressure Pr.

(4) When the detection of reference pressure Pr is completed, power supply to the switchover valve 30 is resumed. As a result, power supply to the motor unit 12, pressure sensor 13, and switchover valve 30 turns on, on and on, respectively. This state is referred to as "internal pressure detection state D" (for example, section D in FIGS. 10A and 10B). Thus, the venting flow path 41 and the valve-connecting flow path 43 are connected to each other. Further, the open flow path 42 and the valve-connecting flow path 43 are disconnected from each other. As a result, the fuel tank 2 and the reference channel 45 are connected to each other. Therefore, the pressure in the reference channel 45 approaches the atmospheric pressure once.

As a result of the motor unit 12 being energized, the operation of the pump 11 is started. The pump 11 may be continuously operated following the reference leak detection state C. When the pump 11 has been operated, the internal pressure in the fuel tank 2 is reduced with time. It may be referred to the pressure change characteristics in section D in FIGS. 10A and 10B, for example. At this time, the pressure in the valve-connecting flow path 43 detected by the pressure sensor 13 is identical with the internal pressure in the fuel tank 2 because the valve-connecting flow path 43 connects to the fuel tank 2.

At this time, based on the pressure change characteristics in section D according to the detection by the pressure sensor 13, the state of leakage from the evaporated fuel purge system 1, including the fuel tank 2, is determined as follows.

When the internal pressure in the valve-connecting flow path 43, that is, the fuel tank 2 falls below the reference pressure Pr with the operation of the pump 11, the statue of leakage from the fuel tank 2, that is, the evaporated fuel purge system 1 is determined acceptable. When the internal pressure in the fuel tank 2 is lower than the reference pressure Pr, the ingress of air into the fuel tank 2, that is, the evaporated fuel purge system 1 from the outside is not present or is only slightly present. This means that the hermeticity of the evaporated fuel purge system 1 is sufficiently attained. For this reason, evaporated fuel produced in the fuel tank 2 is not emitted or is only slightly emitted to the outside. The leakage of evaporated fuel, that is, the state of leakage from the evaporated fuel purge system 1 is determined acceptable.

Meanwhile, when the internal pressure in the fuel tank 2 is not reduced to the reference pressure Pr, the state of leakage from the evaporated fuel purge system 1 is determined in excess of the acceptable level. When the internal pressure in the fuel tank 2 is not reduced to the reference pressure Pr, it is suspected that outside air has entered due to depressurization in the fuel tank 2, that is, the evaporated fuel purge system 1. For this reason, when evaporated fuel is produced in the fuel tank 2, it is suspected that the evaporated fuel is being emitted to the outside at any point of the evaporated fuel purge system 1 including the fuel tank 2. Thus, when the internal pressure in the fuel tank 2 is not reduced to the reference pressure Pr, the leakage of evaporated fuel, that is, the state of leakage from the evaporated fuel purge system 1 is determined in excess of the acceptable level.

When the state of leakage from the evaporated fuel purge system 1 is determined in excess of the acceptable level, some measures are taken. For example, at the next time of the operation of the internal combustion engine, an indicating device informs the driver and other occupants of the vehicle of a leak of evaporated fuel in the evaporated fuel purge system 1. Such indicating means include lighting of an alarm lamp provided on the indicator panel, such as meter panel (not shown).

When the internal pressure in the fuel tank 2 is substantially identical with the reference pressure Pr, there is a leak of evaporated fuel equivalent to the reference orifice 46 from the evaporated fuel purge system 1. In this case as well, the leakage of evaporated fuel, that is, the state of leakage from the evaporated fuel purge system 1 is determined in excess of the acceptable level.

(5) When the inspection on the state of leakage from the evaporated fuel purge system 1 by leak check is completed, power supply to the motor unit 12 and the switchover valve 30 is interrupted (OFF). As a result, power supply to the motor unit 12, pressure sensor 13, and switchover valve 30 turns off, on and off, respectively. This state is referred to as "determination completion state E" (for example, section E in FIGS. 10A and 10B). Thus, the pressure in the valve-connecting flow path 43 and the reference channel 45 is restored to the atmospheric pressure. The ECU 4 confirms that the pressure in the valve-connecting flow path 43 has been restored to the atmospheric pressure. Then, the ECU 4 stops the operation of the pressure sensor 13 to terminate leak check on the evaporated fuel purge system 1.

In case of evaporated fuel purging system which prevents evaporated fuel produced in the fuel tank 2 of the vehicle from being emitted into the atmosphere, a leak check device is also mounted on the vehicle. This leak check device is for, when the state of leakage of evaporated fuel exceeds the acceptable level, informing the occupants and the like of that. For this reason, as a power source for supplying a current to the motor unit 12 which drives the pump 11, an in-vehicle power supply (battery not shown) is used. The battery voltage of a battery may fluctuate due to deterioration or the like. For example, in common 12V-battery vehicles, the battery voltage fluctuates within the range of 8 to 16V.

Figure 12A:
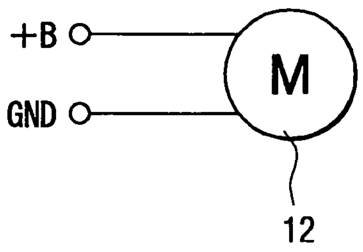
FIG. 12A PRIOR ART
FIG. 12A is a schematic circuit diagram illustrating a drive circuit for a motor pump in the prior art.
Figure 12B:
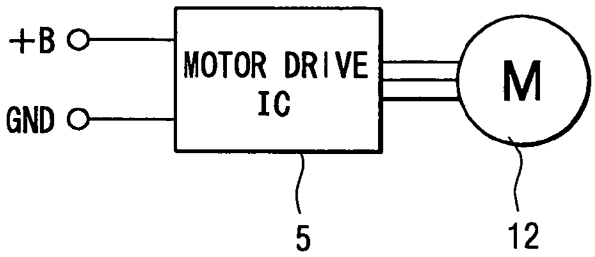
FIG. 12B PRIOR ART
FIG. 12B is another schematic circuit diagram illustrating a drive circuit for a motor pump in the prior art.

In the electrical configurations of the motor units of the conventional motor pumps, illustrated in FIGS. 12A and 12B, as input voltage for supplying the motor units with a current, battery voltage +B is applied to the motor units. With such prior art, when the battery voltage fluctuates due to deterioration or the like, the driving voltage proportionally fluctuates. This can result in change in the motor performance itself of the motor pump, that is, the motor unit 12 or the pump performance itself of the pump 11.

In FIG. 12A, the battery voltage (+B) is applied to the input stage of the motor unit, such as DC motor 12. In FIG. 12B, the motor unit, such as brushless motor 12, has a motor drive circuit (motor drive IC) 5, and the battery voltage (+B) is applied to the input side of the motor drive IC 5. The motor drive IC 5 changes the positions of passing a current through coils (not shown). The motor drive IC 5 thereby controls the driving of the motor 5 which rotatably drives a rotator (not shown) and has no electrical contacts.

Referring to FIGS. 10A, 10B, 11A to 11C, and 12A illustrating comparative examples, the range of variation in the motor performance of the motor unit 12 and in the pump performance of the pump 11 will be described. To the input stage of the motor unit 12 of the motor pump in the comparative examples, the battery voltage is applied (FIG. 12A). The procedures for operating the leak check device in the comparative examples have been described above in contrast with this embodiment, and the description thereof will be omitted. When the battery voltage inputted to the motor unit 12 is low, the output characteristics of the motor unit 12 are lowered, which results in the lowered pump performance of the pump 11.

Figure 10A:
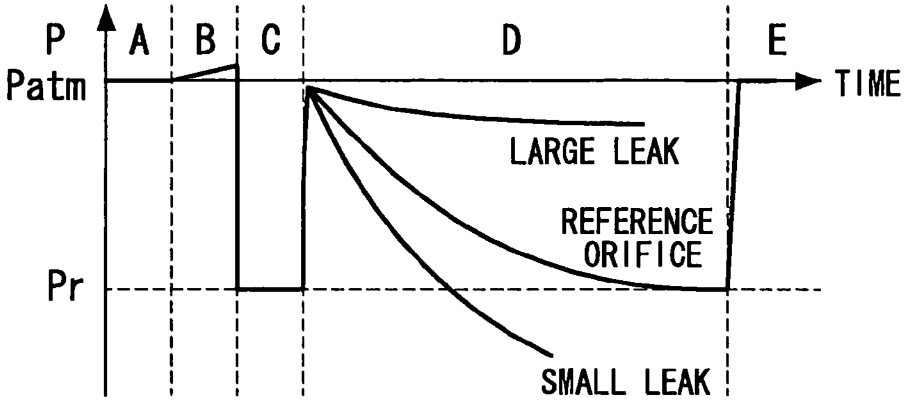
FIG. 10A PRIOR ART
FIG. 10A is a graph plotting pressure change characteristics with low battery voltage in the prior art.

As illustrated in FIG. 10A, the pressure difference between the inside and the outside of the evaporated fuel purge system 1, that is, the pressure difference between reference pressure Pr and atmospheric pressure Patm is reduced. For this reason, the differences are reduced between various pressure characteristics detected in section D: pressure characteristics wherein the state of leakage is acceptable; pressure characteristics wherein the state of leakage is substantially the same as in the reference orifice 46; and pressure characteristics wherein the stats of leakage is in excess of the acceptable level. As a result, there is a possibility that the accuracy of leak detection is degraded.

Figure 10B:
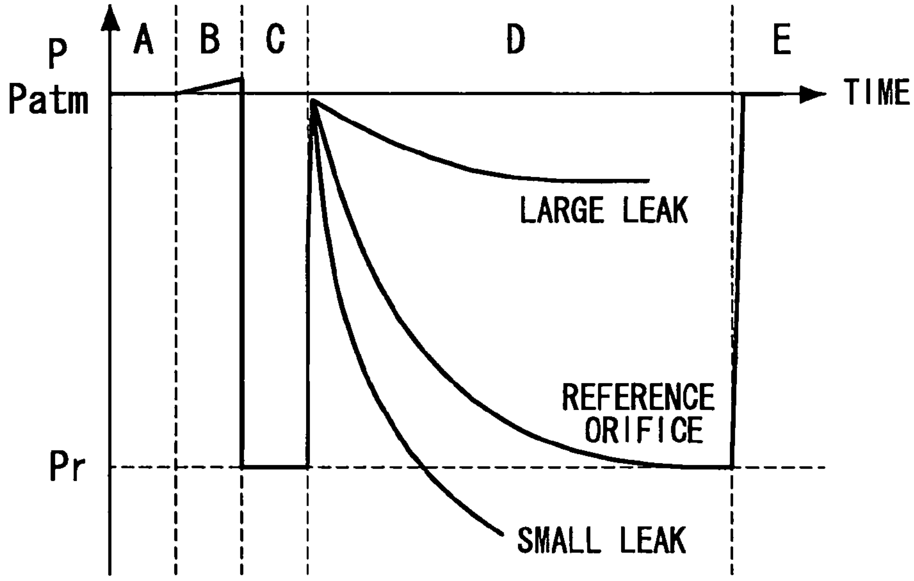
FIG. 10B PRIOR ART
FIG. 10B is a graph plotting pressure change characteristics with high battery voltage in the prior art.

The leak detection is for determining in which state of leakage the size of a leaking hole in the evaporated fuel purge system 1, determined from internal pressure change in section D, is. Meanwhile, when the battery voltage inputted to the motor unit 12 is high, there is a worry that the pressure different between reference pressure Pr and atmospheric pressure Patm becomes too large, as illustrated in FIG. 10B. When the pressure difference is too large, the magnitude of the negative pressure of the reference pressure is also increased. Therefore, the relief valve for failsafe is opened before the reference pressure is reached and a leak cannot be detected.

Figure 11A:
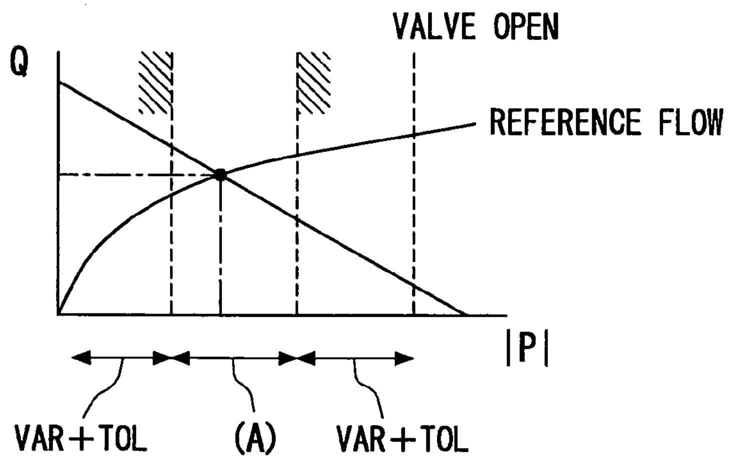
FIG. 11A PRIOR ART
FIG. 11A is a graph plotting the range of pump performance required for producing reference pressure equivalent to a reference leak in the prior art.
Figure 11B:
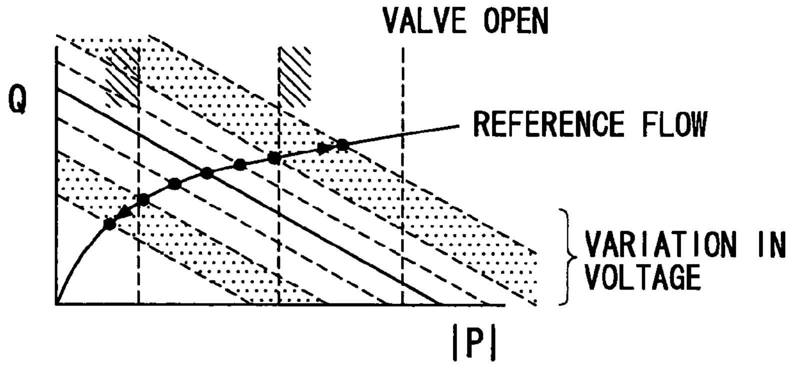
FIG. 11B PRIOR ART
FIG. 11B is a graph plotting the range of reference pressure with factors of variation associated with pump performance taken into account in the prior art.
Figure 11C:
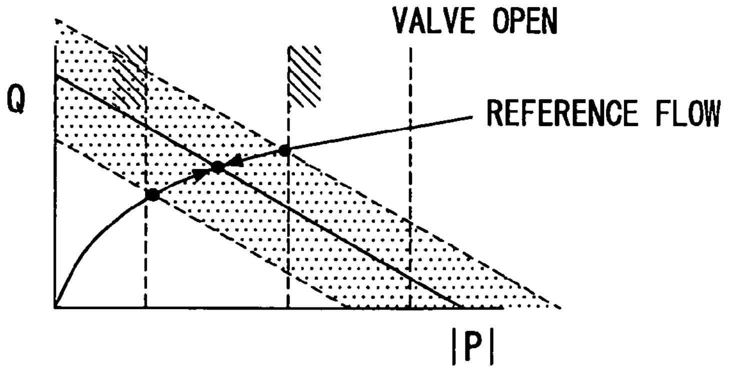
FIG. 11C PRIOR ART
FIG. 11C is a graph plotting ideal pump performance.

Referring to FIGS. 11A to 11C, the influences of variation in pump performance on the reference pressure Pr obtained by the reference orifice 46 will be described below. FIGS. 11A to 11C are graphs which plots the reference pressure obtained by the reference orifice and the range of the pump performance in the comparative examples. FIG. 11A is a graph plotting the range of pump performance required for producing reference pressure equivalent to a reference leak. FIG. 11B is a graph plotting the range of reference pressure with factors of variation associated with pump performance taken into account. FIG. 11C is a graph plotting ideal pump performance. In FIGS. 11A to 11C, the horizontal axes represent the magnitude of pressure, and the vertical axes represent flow rate.

The pump performance of the pump 11 is in proportion to the motor performance of a motor unit 12 for driving the pump 11. In the motor unit 12, such as a DC motor and a brushless motor, the rotational speed and the motor torque are correlated to each other. The rotational speed is maximized under no load, and is reduced with increase in motor torque. The torque which zeroes the rotational speed is a holding torque. As described above, the pump performance is in proportion to the motor performance.

As illustrated in FIG. 11A, under no load, that is, when the produced pressure P is zero, the flow rate Q is maximized. The flow rate Q is lowered with increase in produced pressure P, and the pressure which zeros the flow rate is shutoff pressure. The characteristics (reference flow) of the reference orifice 46 is as plotted in FIGS. 11A to 11C. At the intersection point where the characteristics of the pump and the characteristics of the reference orifice 46 intersect each other in FIG. 11A, reference pressure is produced by the reference orifice 46.

First, variation (VAR) in the pressure P in the evaporated fuel purge system 1 detected by leak check is considered with respect to the upper limit and the lower limit with the reference pressure taken as the center. When the produced pressure P is too high, the relief valve for failsafe is opened. Therefore, the upper limit of variation in the pressure in the evaporated fuel purge system 1 must be considered that the valve opening pressure of the relief valve will not be exceeded. For this reason, the range of variation in pump performance must be controlled so that the reference pressure for causing a reference leak for inspecting the state of leakage from the evaporated fuel purge system 1 will fall within the range A in FIG. 11A. That is, the range A is the range of required reference pressure Pr.

There are various possible factors of variation in pump performance. Such possible factors include variation in, for example, the motor unit 12 due to pump driving source; variation in, for example, battery voltage due to applied voltage for driving the motor unit 12; and the dimensional tolerance (TOL) of the pump 11 due to the suction volume per rotation of the pump 11. Of these factors of variation, the most primary one is battery voltage (8 to 16V for 12V-battery vehicles).

The reference pressures resulting from various factors of variation in the motor pump constituting the leak check device in this embodiment are as plotted in FIG. 11B. A plurality of pump characteristics, indicated by dotted lines, represent variations due to respective factors. The factors of variations are plotted as are integrated along the pump characteristics indicated by a solid line. According to FIG. 11B, the reference pressures caused by these factors of variation exceed and deviate out of the required range. The hatched areas represent variation in pump performance due to variation in applied voltage.

When the pump 11 is a positive displacement pump, such as a vane pump, it can be made unnecessary to take variation in applied voltage, which is the most primary factor, into account. This is done by controlling variation in applied voltage, that is, input voltage which supplies the motor unit 12 with a current to within a certain width of voltage. For example, the pump characteristics can be confined within a required range by carrying out pump chamber adjustment when building in a pump (FIG. 11C).

The pump characteristics can be confined within a required range by carrying out pump chamber adjustment when building in a pump, as illustrated in FIG. 11C. However, there is substantially no margin for this. On this account, variation in applied voltage has great influences on the performance of a pump regardless of whether the pump performance is adjusted or not. Therefore, variation in applied voltage must be eliminated. Adjustment of pump performance can be easily effected by adjusting variation in the motor unit 12 as the pump driving source or the pump 11 (mainly variation in the dimensional tolerance of the valve).

Figure 2:
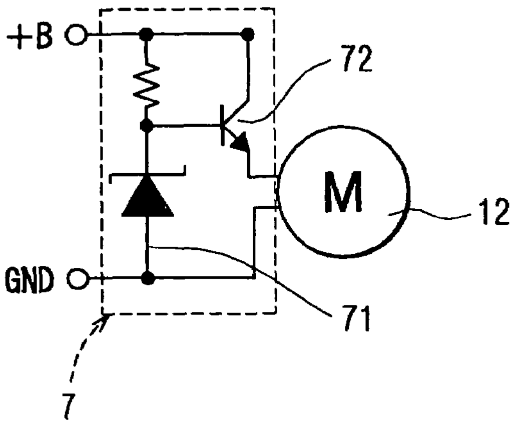
FIG. 2 is a schematic circuit diagram illustrating a drive circuit for a motor pump associated with the leak check device in the first embodiment.
Figure 4A:
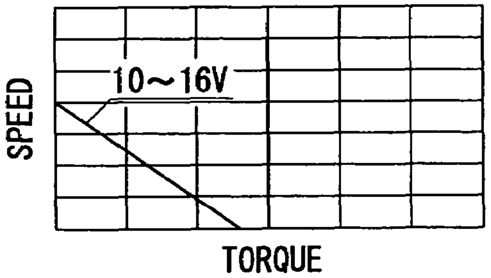
FIG. 4A is a graph plotting the influences of battery voltage fluctuation on motor performance.

For this reason, this embodiment is provided with a voltage control circuit (constant voltage circuit) 7, as illustrated in FIG. 2. The constant voltage circuit 7 controls the battery voltage from the battery to a predetermined voltage, and supplies the motor unit 12 with a current. Thus, the motor unit 12 is fed with an input voltage obtained by converting the battery voltage into the predetermined voltage, by the constant voltage circuit 7. Therefore, even if the battery voltage fluctuates, the input voltage to the motor unit 12 can be regulated to the predetermined voltage within the voltage range within which the battery voltage fluctuates. Therefore, variation in the output characteristics of the motor unit 12 due to fluctuation in battery voltage can be reduced (FIG. 4A).

Figure 4B:
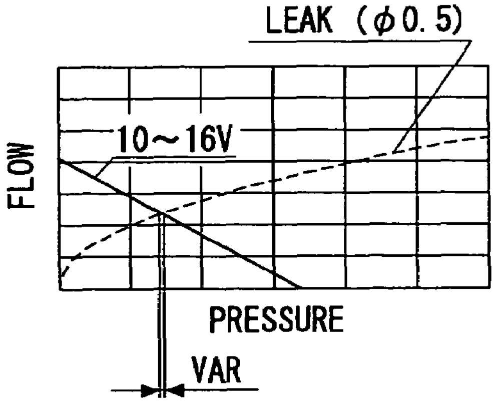
FIG. 4B is a graph plotting the influences of battery voltage fluctuation on pump performance.
Figure 13A:
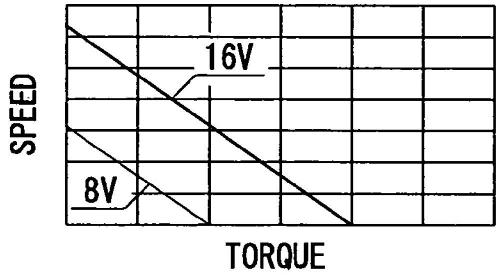
FIG. 13A PRIOR ART
FIG. 13A is a graph plotting the influences of battery voltage fluctuation on motor performance in the prior art.

Furthermore, variation in the pump performance of the pump 11, which is driven by the motor unit 12, can be reduced as shown in FIG. 4B. In this embodiment, the predetermined value of input voltage controlled by the constant voltage circuit 7 is set to 10V, as illustrated in FIG. 4A. Thus, variation in the performance of the motor unit 12, illustrated in FIG. 4A, can be minimized as compared with the prior art illustrated in FIG. 13A, wherein the battery voltage is supplied as input voltage to the motor unit 12. As a result, variation in the pump performance of the pump 11 illustrated in FIG. 4B can be minimized as compared with the prior art illustrated in FIG. 13B.

Here, the battery voltage required for actuating a starter (not shown) as the starting device of the internal combustion engine is approximately 11V or above. For this reason, the battery is charged to some degree beforehand to enhance the battery voltage more than required for driving the starter by a battery charger such as an alternator. For the alternator for use in 12V-battery vehicles, the charging voltage is approximately 13V.

For this reason, in this embodiment, the above predetermined voltage is set within the range of 10V or less. That is, the predetermined voltage is regulated to be less than a voltage required for driving the starter. This takes into account deterioration of the battery which occurs when the vehicle is left standing for the stabilization of temperature, before leak detection by the leak check device. Thus, the accuracy of leak detection is enhanced. Further, the input voltage can be set to the range of 10V or less. In the voltage range within which the battery voltage fluctuates, this range of 10V or less is the region where the input voltage can be easily set to the predetermined voltage by the constant voltage circuit 7.

When the battery is caused to supply a current to the starter and the starter is thereby actuated to start the internal combustion engine, a load is applied to the battery. In this case, the minimum voltage of the battery may drop from approximately 8V to 6V or so. When the setting of the lower limit value of the predetermined value of input voltage controlled by the constant voltage circuit 7 is excessively lowered, a problem may arise. When the battery voltage is higher than the lower limit value, the surplus battery voltage is wastefully converted into heat energy by heat generation from the constant voltage circuit 7. Therefore, it is preferable that the lower limit of the range of input voltage should be 8V or above.

Further, in this embodiment, the constant voltage circuit 7 comprises a Zener diode 71 and a semiconductor device 72, as illustrated in FIG. 2. Thus, only by adding the Zener diode 71 and the semiconductor device 72, the constant voltage circuit 7 for controlling input voltage can control the input voltage to a predetermined voltage regardless of whether the motor unit 12 is under a load or without load. As described above, the constant voltage circuit 7 is constituted with only the Zener diode 71 and the semiconductor device 72 added. Therefore, the accuracy of leak detection is enhanced, and further the constant voltage circuit 7 can be provided at low cost.

Figure 3:
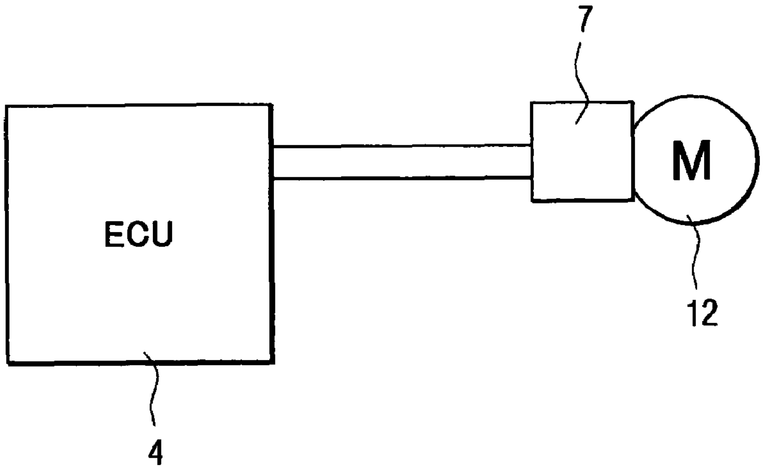
FIG. 3 is a schematic diagram illustrating a voltage control circuit which constitutes the drive circuit for the motor pump in FIG. 1.

In this embodiment, the constant voltage circuit 7 is placed between the battery and the motor unit 12. However, as illustrated in FIG. 3, the constant voltage circuit 7 may be placed between the motor unit 12 and the ECU 4 which is supplied with the battery voltage from the battery. Since the constant voltage circuit 7 is constituted with only the Zener diode 71 and the semiconductor device 72 added, it may be installed and disposed at the input stage at the end of the motor unit 12.

In this embodiment described above, the influences of fluctuations in the battery voltage on pump performance is restricted by the constant voltage circuit 7. Therefore, when a reference leak obtained by the reference orifice 46 and a leak from the evaporated fuel purge system 1 are detected and a difference from an actual leak is measured, the accuracy of leak detection can be also enhanced. Thus, the influences of fluctuation in battery voltage on pump performance are prevented. Further, the reference leak and the actual state of leakage are alternately measured using the switchover valve 30. Therefore, even if simultaneous measurement cannot be made, stable measurement can be carried out regardless of the presence or absence of fluctuation in battery voltage.

Further, in the above embodiment, the influences of fluctuation in the battery voltage on the motor performance of the motor unit 12 and the pump performance of the pump 11 are prevented by the constant voltage circuit 7. Therefore, other methods than the method of directly detecting pressure characteristics by a pressure detecting device such as the pressure sensor 13 can be adopted to detect the state of leakage. For example, the state of operation of the motor unit 12 which drives the pump 11 can be detected to indirectly detect pressure characteristics. In this case, operation characteristic values such as power consumption, rotational speed or electric current value are detected. In this case as well, the accuracy of detecting the state of leakage can be enhanced.

Further, in the above embodiment, the leak check device is actuated according to a certain procedure: prior to the depressurization of the evaporated fuel purge system 1, including the fuel tank 2, the pressure of mixed gas which passed through the valve-connecting flow path 43 is detected. Thus, leak check on the evaporated fuel purge system 1 can be carried out regardless of ambient conditions including altitude (atmospheric pressure), temperature and humidity. As a result, the accuracy of leak detection can be enhanced.

Further, in the above embodiment, the pressure in the valve-connecting flow path 43 connecting to the fuel tank 2, that is, the evaporated fuel purge system 1 is directly detected by the pressure sensor 13. For this reason, the accuracy of leak detection can be enhanced as compared with cases where the pressure in the evaporated fuel purge system 1 is indirectly detected from operation characteristic values such as the electric current value of the motor unit 12.

Further, in the above embodiment, leak detection is carried out by reducing the pressure in the evaporated fuel purge system 1. Thereby, the state of leakage of evaporated fuel from the evaporated fuel purge system 1 is inspected. For this reason, mixed gas is prevented from being emitted to the outside of the evaporated fuel purge system 1 during leak check, and the environment is protected.

Second to Fifth Embodiments

Figure 5:
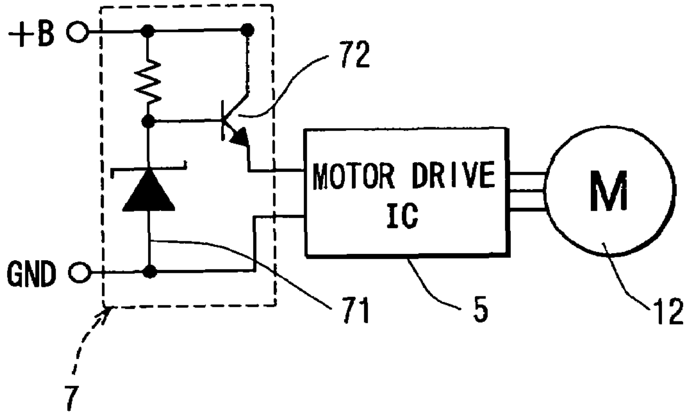
FIG. 5 is a schematic circuit diagram illustrating the drive circuit for a motor pump in the second embodiment of the present invention.

As described above, in the first embodiment, the constant voltage circuit 7 is connected to the input stage of the motor unit 12 for controlling the input voltage which supplies the motor unit 12 with a current to the predetermined voltage. In the second embodiment, the constant voltage circuit 7 is connected to the motor drive IC 5 of the motor unit 12 instead, as illustrated in FIG. 5. Thus, as a motor unit 12 for driving the pump 12, a brushless motor which has no electrical contacts and has no slidable contact portions can be used. The motor unit 12 may be a DC motor or a brushless motor having the motor drive IC 5. In either case, input voltage which supplies the motor unit 12 with a current can be controlled by the constant voltage circuit 7. Even if evaporated fuel from the evaporated fuel purge system 1 sweeps through the canister 3 and enters the pump 11 and the motor unit 12, local wear is prevented, and the life of the leak check device can be lengthened.

Figure 6A:
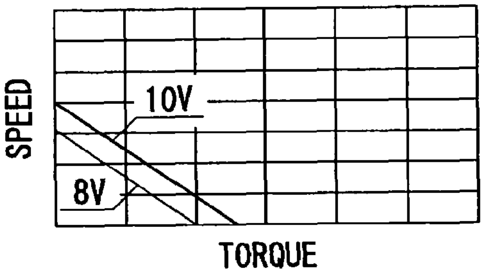
FIG. 6A is a graph plotting the influences of battery voltage fluctuation on motor performance in the third embodiment of the present invention.
Figure 6B:
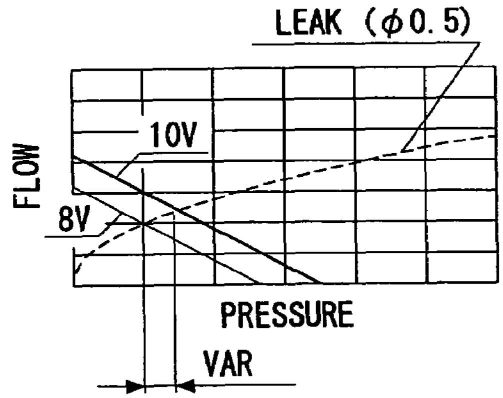
FIG. 6B is a graph plotting the influences of battery voltage fluctuation on pump performance in the third embodiment.

The predetermined voltage to which the input voltage is controlled by the constant voltage circuit 7 is not limited to that in the first embodiment. In the third embodiment, the input voltage is controlled within the predetermined voltage range illustrated in FIGS. 6A and 6B. In this embodiment, changes from 8V to 10V is allowed as the range of input voltage controlled by the constant voltage circuit 7, as illustrated in FIG. 6A. In FIGS. 6A and 6B, the thick solid lines indicate characteristics with the input voltage being 10V, the upper limit, and the thin solid lines indicate characteristics with the input voltage being 8V, the lower limit.

Figure 13B:
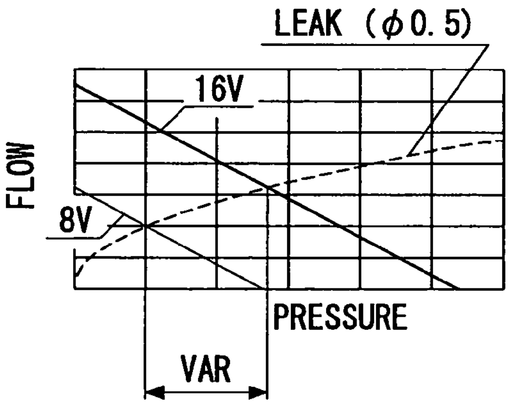
FIG. 13B PRIOR ART
FIG. 13B is a graph plotting the influences of battery voltage fluctuation on pump performance in the prior art.

Thus, variation VAR in the performance of the motor unit 12 illustrated in FIG. 6A can be reduced as compared with the prior art illustrated in FIG. 13B. The amount of this reduction is equivalent to the margin of fluctuation in the input voltage which is reduced from 8 to 16V to 8 to 10V. As a result, variation VAR in the pump performance of the pump 11 illustrated in FIG. 6B can be reduced as compared with the prior art illustrated in FIG. 13B. This width of input voltage setting is not limited to 8 to 10V, and may be other values, for example, 9 to 10V, or 9.5 to 10V.

Further, relatively wide latitude can be allowed as the set value of input voltage controlled by the constant voltage circuit 7. Thus, high accuracy is not required for the set value of input voltage, and thus a relatively inexpensive constant voltage circuit 7 can be used.

Figure 7:
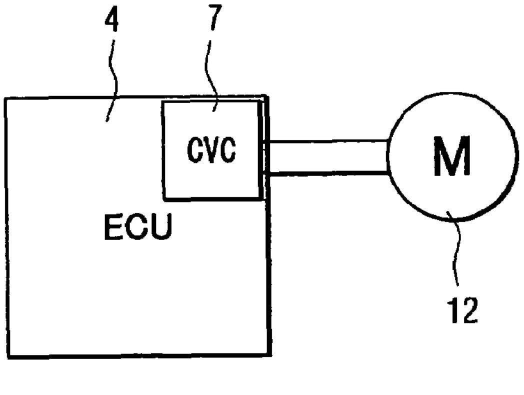
FIG. 7 is a schematic diagram illustrating the voltage control circuit in the fourth embodiment of the present invention.
Figure 8:
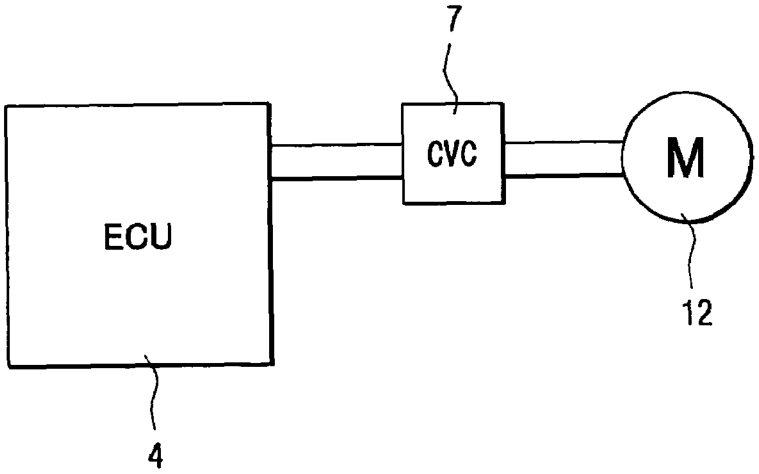
FIG. 8 is a schematic diagram illustrating the voltage control circuit in the fifth embodiment of the present invention.

In the first embodiment, the constant voltage circuit 7 is installed at the input stage at the end of the motor unit 12 between the ECU 4 and the motor unit 12. The position of the constant voltage circuit 7 is not limited to this. In the fourth embodiment illustrated in FIG. 7, the constant voltage circuit 7 is disposed on the ECU 4 side, more specifically, within the ECU 4. In the fifth embodiment illustrated in FIG. 8, the constant voltage circuit 7 is disposed in an intermediate position between the ECU 4 and the motor unit 12. The fourth and fifth embodiments produce the same effect as in the first embodiment.

Sixth Embodiment

Figure 9:
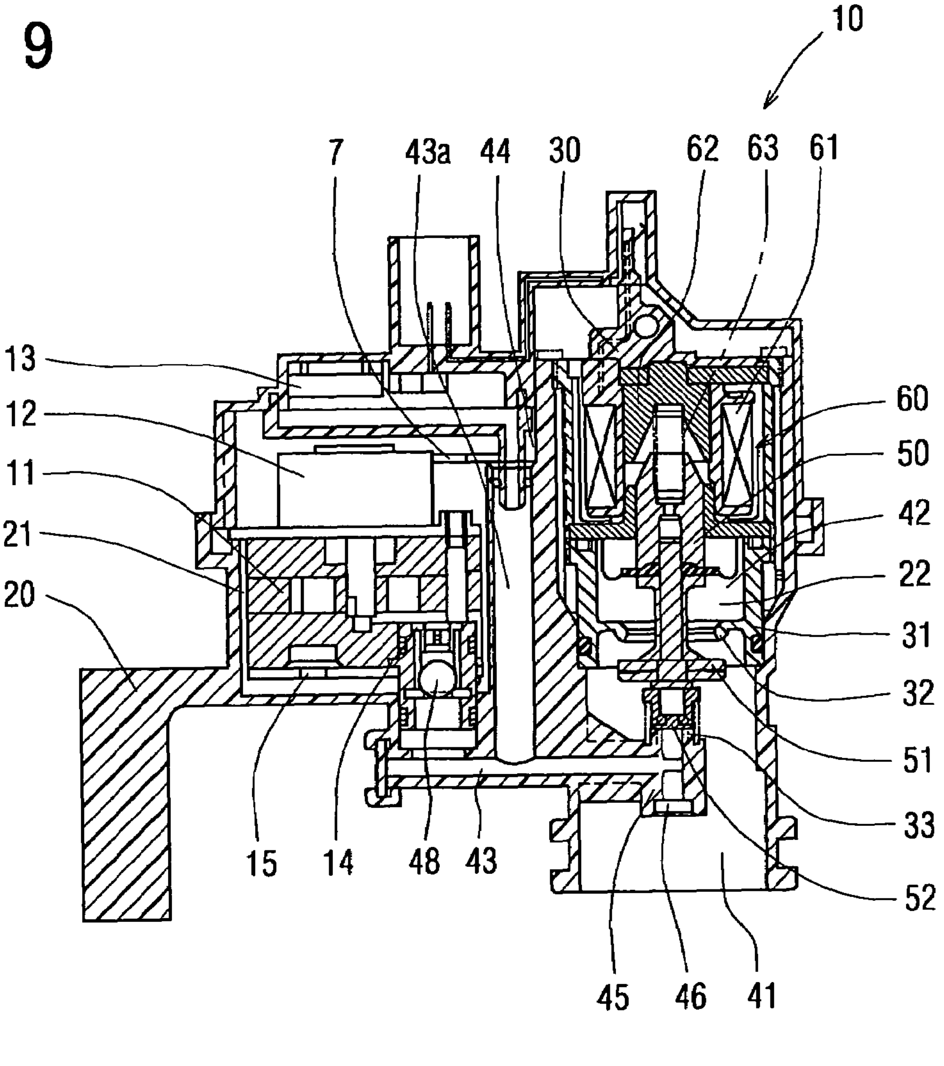
FIG. 9 is a cross-sectional view of a leak check module in the sixth embodiment of the present invention.

In the six embodiment, of the constituent members of the leak check device described as the first embodiment, those disposed in the dotted line in FIG. 1 are integrally assembled into a module. Specifically, the leak check module 10 is constructed as illustrated in FIG. 9. The leak check module 10 comprises a housing 20, a pump 11, a motor unit 12, a switchover valve 30 and a pressure sensor 13.

The housing 20 houses the pump 11, motor unit 12 and switchover valve 30. The housing 20 comprises a pump chamber 21 for housing the pump 11 and a valve chamber 22 for housing the switchover valve 30. The housing 20 further comprises a venting flow path 41, an open flow path 42, a valve-connecting flow path 43, an exhaust flow path 44 and a reference channel 45. The venting flow path 41 runs from the valve chamber 22 in the housing 20 to the fuel tank 2 by way of the canister 3. The open flow path 42 runs from the valve chamber 22 to the open end 42*a*. The valve-connecting flow path 43 connects the pump chamber 21 and the valve chamber 22.

The valve-connecting flow path 43 is provided with a pressure introducing passage 43*a* which is branched from the valve-connecting flow path 43. At the upper end of the pressure introducing passage 43*a*, the pressure sensor 13 is housed as is fixed on the inner circumferential surface of the housing 20. Thus, the pressure in the valve-connecting flow path 43 and the reference channel 45 is detected by the pressure sensor 13 through the pressure introducing passage 43*a*.

The exhaust flow path 44 connects the pump chamber 21 and the open flow path 42 through the valve chamber 22. The valve-connecting flow path 43 and the reference channel 45 are branched from each other in the direction of the axis of the switchover valve 30. The reference channel 45 is open toward the venting flow path 41 or downward.

The pump 11 is housed in the pump chamber 21, and has an admission port 14 and an exhaust port 15. The admission port 14 is disposed in the valve-connecting flow path 43, and the exhaust port 15 is disposed in the pump chamber 21. When the pump 11 is driven by the motor unit 12, air in the valve-connecting flow path 43 is taken into the pump 11. A check valve 48 is placed between the admission port 14 and the valve-connecting flow path 43.

As illustrated in FIG. 9, the switchover valve 30 comprises a valve body 31 and an electromagnetic drive unit 60. The electromagnetic drive unit 60 comprises a moving member 50, a coil 61, a core 62, a spring 63 and the like. The valve body 31 is housed in the valve chamber 22. The valve body 31 has a first valve seat 32 on the venting flow path 41 side. The valve member 51 attached to the moving member 50 can abut the first valve seat 32. With movement of the moving member 50, the valve member 51 is abutted against the first valve seat 32. As a result, the venting flow path 41 and the open flow path 42 are disconnected from each other.

Further, the venting flow path 41 and the valve-connecting flow path 43 are connected to each other. The moving member 50 has an abutting portion 52, and the abutting portion 52 can be abutted against a second valve seat 33 which is formed at the end of the valve-connecting flow path 43 on the valve chamber 22 side. With movement of the moving member 50, the abutting portion 52 is abutted against the second valve seat 33. As a result, the venting flow path 41 and the open flow path 42 are connected to each other, and further the venting flow path 41 and open flow path 42 and the valve-connecting flow path 43 are disconnected from each other.

The moving member 50 is driven by electro magnetic force from the coil 61 constituting the electromagnetic drive unit 60 and biasing force from the spring 63 constituting the same. The electromagnetic drive unit 60 has the coil 61 electrically connected with the ECU 4. By passing a current through the coil 61, a magnetic field is produced in the core 62, which attracts the moving member 50 upward in the axial direction. The moving member 50 is kept energized by the spring 63 in the direction opposite the direction of attraction by electromagnetic force from the coil 61.

When the passage of a current through the coil 61 is at a stop, the moving member 50 is moved downward by energizing force from the spring 63, as illustrated in FIG. 9, and the abutting portion 52 is in contact with the second valve seat 33. For this reason, the venting flow path 41 and the open flow path 42 are connected to each other, and further the venting flow path 41 and open flow path 42 and the valve-connecting flow path 43 are connected to each other through the reference channel 45.

The constant voltage circuit 7 is electrically connected with the input stage at the end of the motor unit 12, and is fixed on the motor unit 12. Thus, the constant voltage circuit 7 can be also modularized, and the assembling workability is enhanced. For example, vehicles for a place of destination where leakage standards are different can be coped with just by building only a leak check module 10 meeting the leakage standards in the fuel tank 2, that is, the evaporated fuel purge system 1.

The above embodiments have been described based on cases where a 12V-battery whose battery voltage fluctuates within the range of 8 to 16V is used as an in-vehicle power supply. However, the specifications for battery are not limited to a nominal voltage of 12V. There are a variety of batteries different in nominal voltage for various applications. Therefore, the voltage of a current supplied from the constant voltage circuit 7 to the motor unit 12 is preferably 84% or below of the nominal voltage value of battery voltage. For 24V-battery used as, for example, battery for trucks, the voltage is preferably 20V or below.

What is claimed is:

1. A leak check device comprising:

an evaporated fuel purge system including a fuel tank, an adsorption filter which connects to the fuel tank through a connecting pipe and has a venting flow path, and a vent valve connected to an intake system of an engine through a valve flow path;

a pump which pressurizes or depressurizes the venting flow path to inspect state of leakage in the evaporated fuel purge system;

a motor unit which drives the pump for applying or reducing pressure;

an in-vehicle battery for the motor unit; and a voltage control circuit which controls a battery voltage supplied from the in-vehicle battery to the motor unit to a predetermined voltage, wherein the predetermined voltage is more than 67% of a nominal voltage of the in-vehicle battery and wherein the predetermined voltage of less than 84% of the nominal voltage of the in-vehicle battery.

2. The leak check device for evaporated fuel purging system according to claim 1, further comprising:

a reference channel placed in parallel with the venting flow path; and a switchover valve for switching flow paths which is capable of connecting the reference channel to the pump in place of the venting flow path, wherein pressure increased or reduced by the pump is alternately applied to the reference channel and the venting flow path through the switchover valve.

3. The leak check device for evaporated fuel purging system according to claim 2, wherein the leakage is determined by measuring at least one of pressure characteristics, the power consumption, rotational speed and electric current of the motor unit when pressure is applied to the reference channel and to the venting flow path and comparing measurement results.

4. The leak check device for evaporated fuel purging system according to claim 1, wherein the voltage control circuit supplies the predetermined voltage of less than 20V, when a nominal voltage of the battery is 24V.

5. The leak check device for evaporated fuel purging system according to claim 1, wherein the voltage control circuit is placed between the battery and an input stage of the motor unit or between the battery and a circuit dedicated to motor driving for the motor unit.

6. The leak check device for evaporated fuel purging system according to claim 1, wherein the voltage control circuit comprises a Zener diode and a semiconductor device, and wherein the predetermined voltage is less than the voltage required for driving a starter of the vehicle.

7. The leak check device for evaporated fuel purging system according to claim 2, wherein the pump, the motor unit, and the switchover valve for switching flow paths are integrally assembled into a module.

8. A leak check device comprising:

an evaporated fuel purge system including a fuel tank, an adsorption filter which connects to the fuel tank through a connecting pipe and has a venting flow path, and a vent valve connected to an intake system of an engine through a valve flow path;

a pump which pressurizes or depressurizes the venting flow oath to inspect state of leakage in the evaporated fuel purge system;

a motor unit which drives the pump for applying or reducing pressure;

an in-vehicle battery for the motor unit; and a voltage control circuit which controls a battery voltage supplied from the in-vehicle battery to the motor unit to a predetermined voltage and wherein the predetermined voltage is more than 8V, wherein the voltage control circuit supplies the predetermined voltage of more than 8V and less than 10V, when a nominal voltage of the battery is 12V.

9. The leak check device for evaporated fuel purging system according to claim 8, wherein the predetermined voltage is less than the voltage required for driving a starter of the vehicle.

* * * * *